(12) United States Patent
Britt et al.

(10) Patent No.: US 8,904,445 B2
(45) Date of Patent: Dec. 2, 2014

(54) METHODS AND APPARATUS TO MANAGE BANDWIDTH ALLOCATIONS IN MEDIA DELIVERY NETWORKS

(75) Inventors: James Austin Britt, San Antonio, TX (US); Tara Hines, McKinney, TX (US); Adam Klein, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 192 days.

(21) Appl. No.: 13/012,549

(22) Filed: Jan. 24, 2011

(65) Prior Publication Data
US 2012/0192234 A1    Jul. 26, 2012

(51) Int. Cl.
| | |
|---|---|
| G06F 3/00 | (2006.01) |
| H04N 21/433 | (2011.01) |
| H04N 21/488 | (2011.01) |
| H04N 21/458 | (2011.01) |
| H04N 21/24 | (2011.01) |
| H04N 5/782 | (2006.01) |
| H04N 21/472 | (2011.01) |
| H04N 21/442 | (2011.01) |

(52) U.S. Cl.
CPC .......... *H04N 5/782* (2013.01); *H04N 21/4334* (2013.01); *H04N 21/4882* (2013.01); *H04N 21/4583* (2013.01); *H04N 21/2402* (2013.01); *H04N 21/47214* (2013.01); *H04N 21/44209* (2013.01)
USPC .................. 725/58; 725/46; 725/54; 725/90; 725/93; 725/95

(58) Field of Classification Search
CPC ..... H04N 5/50; H04N 5/782; H04N 21/2402; H04N 21/442; H04N 21/4532; H04N 21/64738; H04N 21/4334; H04N 21/4882; H04N 21/6478; H04N 21/47214; H04N 21/44209
USPC .............................. 725/58, 95, 46, 54, 90, 93
See application file for complete search history.

(56) References Cited

U.S. PATENT DOCUMENTS

| | | | |
|---|---|---|---|
| 5,909,594 A | 6/1999 | Ross et al. | |
| 6,177,931 B1 * | 1/2001 | Alexander et al. | 725/52 |
| 6,310,886 B1 | 10/2001 | Barton | |
| 6,452,935 B1 | 9/2002 | Gibbs | |
| 6,774,926 B1 * | 8/2004 | Ellis et al. | 348/14.01 |
| 6,947,388 B1 | 9/2005 | Wagner | |
| 6,986,156 B1 | 1/2006 | Rodriguez et al. | |
| 7,158,531 B2 | 1/2007 | Barton | |
| 7,617,515 B1 * | 11/2009 | Laksono | 725/93 |
| 7,617,516 B2 * | 11/2009 | Huslak et al. | 725/95 |
| 7,770,200 B2 | 8/2010 | Brooks et al. | |
| 7,802,286 B2 | 9/2010 | Brooks et al. | |
| 7,827,582 B2 * | 11/2010 | Ellis | 725/93 |
| 7,958,532 B2 * | 6/2011 | Paul et al. | 725/90 |

(Continued)

*Primary Examiner* — Nasser Goodarzi
*Assistant Examiner* — Michael B Pierorazio
(74) *Attorney, Agent, or Firm* — Hanley, Flight and Zimmerman, LLC

(57) ABSTRACT

A disclosed example method to manage network bandwidth allocation in a media delivery environment involves detecting insufficient bandwidth available to deliver requested media to a media receiver and presenting user-selectable options via the media receiver to allocate bandwidth to deliver the requested media to the media receiver. The example method also involves receiving a first user selection of one of the user-selectable options and implementing the selected one of the user-selectable options specifying a second user selection identifying a particular media stream to be delivered at a media quality that is lower than a higher media quality previously selected for that particular media stream.

20 Claims, 9 Drawing Sheets

(56) References Cited

U.S. PATENT DOCUMENTS

| | | | |
|---|---|---|---|
| 8,079,053 B2* | 12/2011 | Yampanis et al. | 725/93 |
| 8,108,901 B2* | 1/2012 | Nicas et al. | 725/100 |
| 8,185,927 B2* | 5/2012 | Karaoguz et al. | 725/105 |
| 8,375,414 B2* | 2/2013 | Covey | 725/95 |
| 8,544,048 B2* | 9/2013 | Wiser et al. | 725/97 |
| 2002/0116518 A1* | 8/2002 | Silen et al. | 709/231 |
| 2002/0174430 A1* | 11/2002 | Ellis et al. | 725/46 |
| 2003/0005454 A1* | 1/2003 | Rodriguez et al. | 725/89 |
| 2003/0106070 A1* | 6/2003 | Saam | 725/135 |
| 2003/0145323 A1 | 7/2003 | Hendricks et al. | |
| 2004/0261113 A1* | 12/2004 | Paul et al. | 725/90 |
| 2005/0160461 A1* | 7/2005 | Baumgartner et al. | 725/52 |
| 2006/0037083 A1 | 2/2006 | Kortum et al. | |
| 2006/0136965 A1* | 6/2006 | Ellis et al. | 725/46 |
| 2006/0209906 A1 | 9/2006 | Dabrowa | |
| 2006/0215650 A1 | 9/2006 | Wollmershauser et al. | |
| 2007/0033533 A1* | 2/2007 | Sull | 715/752 |
| 2007/0157260 A1* | 7/2007 | Walker | 725/86 |
| 2007/0157281 A1* | 7/2007 | Ellis et al. | 725/134 |
| 2008/0075423 A1* | 3/2008 | DeBie | 386/83 |
| 2008/0137549 A1* | 6/2008 | Manthoulis | 370/252 |
| 2008/0184297 A1* | 7/2008 | Ellis et al. | 725/39 |
| 2008/0201748 A1 | 8/2008 | Hasek et al. | |
| 2008/0285936 A1* | 11/2008 | Yampanis et al. | 386/46 |
| 2008/0301746 A1* | 12/2008 | Wiser et al. | 725/114 |
| 2010/0005499 A1* | 1/2010 | Covey | 725/109 |
| 2010/0011390 A1* | 1/2010 | Coles et al. | 725/25 |
| 2010/0023976 A1* | 1/2010 | Coles et al. | 725/82 |
| 2010/0031162 A1* | 2/2010 | Wiser et al. | 715/747 |
| 2010/0046913 A1* | 2/2010 | Coles et al. | 386/83 |
| 2010/0058400 A1* | 3/2010 | Nicas et al. | 725/74 |
| 2010/0095337 A1 | 4/2010 | Dua | |
| 2010/0158134 A1* | 6/2010 | Yin et al. | 375/240.26 |
| 2010/0195988 A1* | 8/2010 | Coles et al. | 386/124 |
| 2010/0325666 A1* | 12/2010 | Wiser et al. | 725/44 |
| 2012/0137015 A1 | 5/2012 | Sun | |
| 2012/0215911 A1* | 8/2012 | Raleigh et al. | 709/224 |

* cited by examiner

METHODS AND APPARATUS TO MANAGE BANDWIDTH ALLOCATIONS IN MEDIA DELIVERY NETWORKS

FIELD OF THE DISCLOSURE

The present disclosure relates generally to network communications and, more particularly, to methods and apparatus to manage bandwidth allocations in media delivery networks.

BACKGROUND

In recent years, newer media delivery systems have been built around Internet protocol (IP) infrastructures in which media feeds or streams are delivered to client sites via digital networks using IP-based protocols. Today's IP-based media delivery systems operate on digital networks in which bandwidth constraints are common limitations.

DETAILED DESCRIPTION

Figure 1:
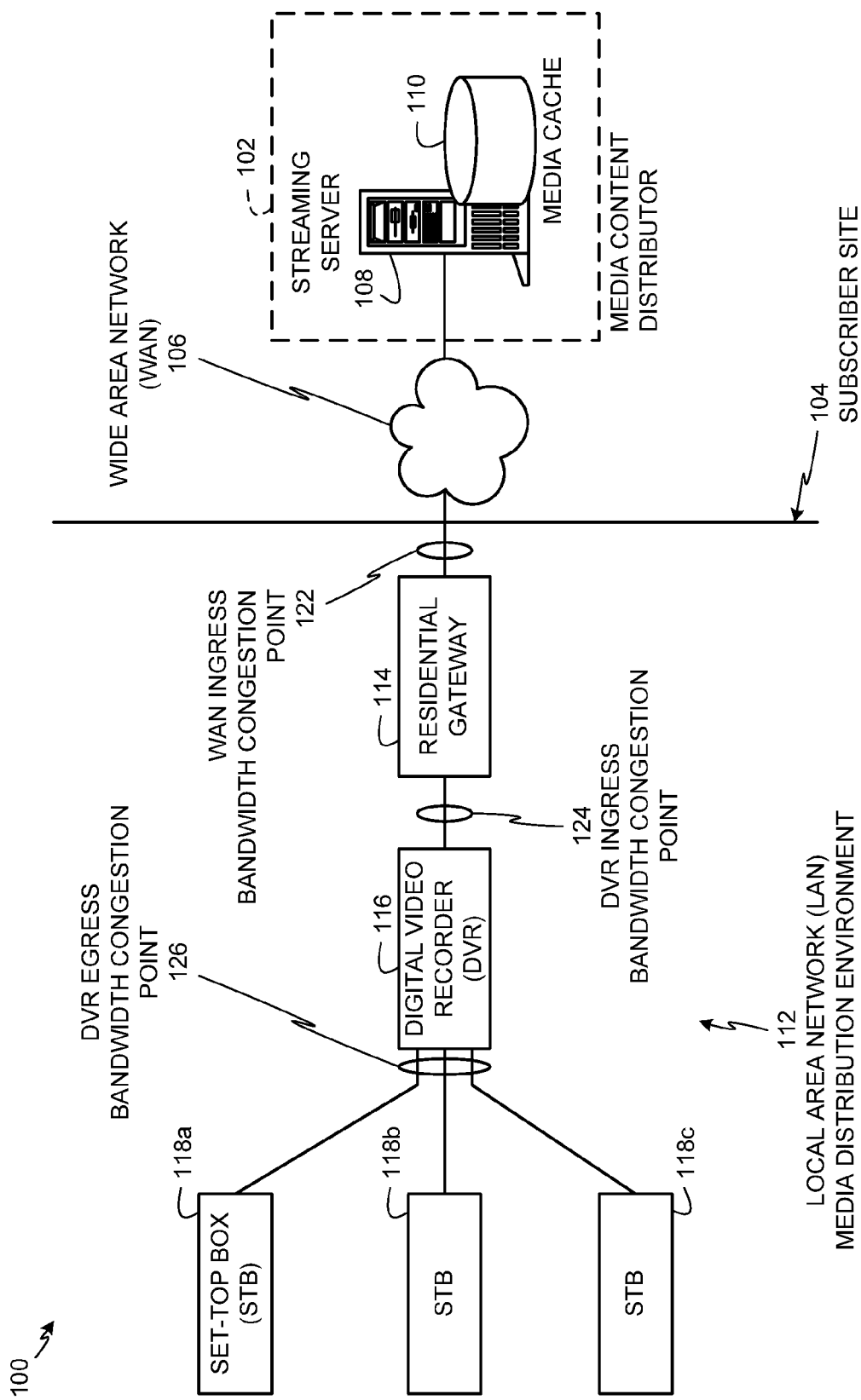
FIG. 1 depicts an example system to deliver media to client devices in a network environment.

Example methods, apparatus, systems, and articles of manufacture disclosed herein are associated with Internet-based media services received in a home or other media subscriber sites (e.g., commercial establishments, offices, service establishments, retailers, etc.). Most Internet service providers offer tiered services based on available bandwidths (e.g., data transmission rates). Higher bandwidth Internet access enables streaming, downloading, or otherwise receiving more data simultaneously than with lower bandwidth Internet access. However, with any tier Internet access service, bandwidth is typically limited to some maximum amount for a particular subscriber site. That is, the amount of data that can be simultaneously received at a subscriber site is limited by its available subscriber site bandwidth.

Subscriber site bandwidth conflicts occur when a subscriber site is using all of its bandwidth and attempts to access another service that requires more bandwidth than the customer has available. Such conflicts are becoming more prevalent involving, for example, Internet Protocol Television (IPTV) services that require greater amounts of bandwidth such as 1080p High Definition video, video on demand, 3D TV, etc.

Similarly, bandwidth limitations may exist within a media delivery network of a subscriber site that distributes media content within the subscriber site. For example, a subscriber site may have a single, central digital video recorder (DVR) connected or networked to multiple set-top boxes at different televisions throughout the subscriber site. In such examples, all program recordings and recording playbacks are performed by the central DVR and made available by the DVR to any of the set-top boxes in the subscriber site. Thus, the DVR imposes an ingress bandwidth limitation related to a quantity of streams that the DVR can receive and record simultaneously and/or an egress bandwidth limitation related to playing back recorded media to one or more set-top boxes.

In some known IP-based media delivery systems, when a bandwidth conflict occurs at a subscriber home based on media delivered to the home, a customer at the home is presented with troubleshooting tips on how to resolve the conflict. However, in such known systems, the customer must manually implement solutions. For example, if the customer elects to stop a recording at a DVR within the home to release bandwidth used for the recording, the customer must manually go to the DVR recording screen and manually stop a recording. If the customer chooses to interrupt a service (e.g., a streaming program), the media delivery system autonomously determines which service to interrupt without allowing the customer any choice on which service to stop.

Example methods, apparatus, systems, and articles of manufacture disclosed herein provide users at subscriber sites with detailed levels of user control over how to resolve bandwidth conflicts. Some such example methods, apparatus, systems, and articles of manufacture disclosed herein enable customers to selectively stop or interrupt one or more media streaming or data-receiving services that are currently in use within their home (e.g., at one or more IPTV-enabled televisions or computers in their home) in order to request or access another media streaming or data-receiving service for which additional bandwidth is required. In the context of IPTV, multiple standard definition (SD) and/or high definition (HD) video streams may need to be interrupted or stopped to allow the viewing of one 3D video stream at a single IPTV-enabled television.

In some examples, messaging is provided to one or more IPTV set-top boxes (e.g., IPTV receivers) within a home with options for resolving detected or predicted bandwidth conflicts. In some examples, a future bandwidth conflict may be predicted based on an upcoming scheduled recording in a networked DVR (e.g., if one or more IPTV sessions are currently in progress and sufficient bandwidth is not available for the scheduled recording). In addition, a current bandwidth conflict may be detected when a user has requested a streaming service while one or more IPTV sessions are already currently in progress and sufficient bandwidth is not available for the additional requested streaming service.

Example options for resolving detected or predicted bandwidth conflicts include displaying a list of current service sessions (e.g., ongoing IPTV streams) within a home with options to interrupt or stop one or more of those service sessions or downgrade the quality (e.g., HD video to SD video) of one or more of those service sessions. Additionally or alternatively, the options may include offering the user a version of a service currently requested by that user that is of lower quality (e.g., an SD stream rather than an HD stream) so that other ongoing streaming services in the home need not be interrupted or downgraded. For example, if a user requests to watch an HD IPTV program and sufficient bandwidth is not available to deliver the HD stream because of other IPTV streams currently being received in the home, the user may be presented with the option to instead receive an SD version of the selected IPTV program.

Unlike known conflict resolution techniques, in which media receiver/presentation devices (e.g., set-top boxes, DVRs, etc.) autonomously select how to implement solutions to bandwidth conflicts without detailed user input or user-selectable options, some example methods, apparatus, systems, and articles of manufacture disclosed herein enable users to select details of how bandwidth conflicts are resolved. In this manner, undesirable quality downgrades or service interruptions are not automatically enforced in an autonomous and unpredictable manner without user approval or consent.

Turning now to FIG. 1, an example system 100 to deliver media to client devices in a network environment is shown. In the illustrated example, the system 100 includes a media content distributor 102 in communication with a subscriber site 104 via a wide area network (WAN) 106. In the illustrated example, the media content distributor 102 includes a streaming server 108 and a media cache 110. The streaming server 108 delivers media streams to the subscriber site 104 and the media cache 110 caches or stores media files from which the streaming server 108 delivers the media streams. In the illustrated example, the streaming server 108 transmits media streams via the WAN 106 using, for example, IP-based communications. The WAN 106 may be the Internet and/or any other network located between the media content distributor 102 and the subscriber site 104.

The media content delivered by the media content distributor 102 may be scheduled programming (e.g., television programs, program episodes, news, talk shows, movies, or any other type of television programming) or media available via an on-demand service. Also in the illustrated example, the media cache 110 may store different quality versions of each media content. For example, the media cache 110 may store an SD version, one or more HD versions (e.g., 720p, 1080i, and/or 1080p), and/or a three-dimensional (3D) version of the same media content. In this manner, users at subscriber sites (e.g., the subscriber site 104) can select which media quality to receive. As discussed below, such media quality selections may be based on the amount of unused bandwidth currently available to a subscriber site (e.g., the subscriber site 104) or in a media delivery network in the subscriber site.

In the illustrated example of FIG. 1, the subscriber site 104 is subscribed to an Internet access service at a maximum download data transmission rate (e.g., a maximum bandwidth). Thus, the subscriber site 104 can receive as many simultaneous media streams from the media content distributor 102 and/or any other media content distributors (not shown) as possible based on the maximum bandwidth capacity corresponding to the subscribed Internet access service of the subscriber site 104. For example, the subscriber site 104 may receive multiple media streams to be presented at multiple televisions simultaneously within the subscriber site 104. Alternatively or additionally, the subscriber site 104 may receive one or more media streams for presentation in real-time while simultaneously receiving one or more media streams to be digitally recorded at the same time.

Illustrated examples disclosed herein may be used in connection with one or more different types of media delivery systems including IPTV systems, media stream request systems (e.g., users select from available titles to stream), on-demand media systems, media download-and-store systems (e.g., media files are downloaded and stored locally in their entireties for subsequent viewing rather than streaming and playing/recording in real time), etc. Thus, although examples are disclosed herein in connection with users requesting, interrupting, or stopping media streams or media delivery, such media requests may be implemented in any number of different manners. For example, a user changing a channel in an IPTV media delivery system may cause a change in media streams being delivered to a subscriber site. A user selecting an on-demand title causes a corresponding media stream to be delivered to a subscriber site. A user clicking on a media link in a web page causes corresponding media content to be streamed or downloaded to a subscriber site. Thus, examples disclosed herein may be used in connection with any type of media delivery system, and example user-specified actions disclosed herein to resolve bandwidth congestion may be implemented as is suitable in such different types of media delivery systems (e.g., changing an IPTV channel, disabling or stopping an IPTV channel stream, stopping an on-demand media stream, stopping a media file stream or download, etc.) to achieve the desired results of resolving bandwidth congestion.

Example techniques disclosed herein may be used in connection with maximum bandwidth settings established by ISPs to individual subscriber sites. Additionally or alternatively, example techniques disclosed herein may be used in connection with maximum bandwidth settings set by users at subscriber sites. For example, a user at a subscriber site may elect to artificially set a lower maximum bandwidth threshold available to the subscriber site (e.g., by setting the lower maximum bandwidth threshold at a residential gateway (RG) of the subscriber site). In addition, although examples are disclosed herein in connection with maximum bandwidths, example techniques disclosed herein may alternatively or additionally be used in connection with maximum incoming media streams into a subscriber site. For example, an ISP (or a user at a subscriber site) may set a maximum number of media streams that can simultaneously be received at a subscriber site. In such examples, example techniques disclosed herein may be used to detect the occurrence of a maximum allowable number of media streams being delivered to a subscriber site and/or to predict a future occurrence of a maximum allowable number of media streams to be delivered to the subscriber site and to overcome such maximum media stream congestion.

In the illustrated example of FIG. 1, the subscriber site 104 includes a local area network (LAN) media distribution environment 112 in which a residential gateway (RG) 114, a DVR 116, and set-top box (STB) devices 118a-c (e.g., media client devices) are networked. In this manner, media streams received at the subscriber site 104 may be delivered within the LAN media distribution environment 112 to the DVR 116 for recording and/or to one or more of the STBs 118a-c for presentation via respective televisions in communication with the STBs 118a-c. In addition, the DVR 116 can playback and deliver previously recorded media content to any of the STBs 118a-c. Although the DVR 116 is shown separate from the STBs 118a-c in the illustrated example, in some examples, the DVR 116 may be implemented in one of the STBs 118a-c, in the RG 114, or in any other STB connected to a respective television.

In the illustrated example, the RG 114 is assigned a public IP address by an Internet service provider (ISP) (not shown) so that the RG 114 can communicate with entities outside the subscriber site 104 via the WAN 106. For example, the public IP address enables the RG 114 to receive media streams from the media content distributor 102 and/or any other media content distributor. Also in the illustrated example, each of the RG 114, the DVR 116, and the STBs 118a-c are associated with a respective private IP address to enable communications within the LAN media distribution environment 112. For example, when media streams are received at the RG 114 from the WAN 106, the RG 114 can use the private IP addresses to distribute such media streams selectively to any of the DVR 116 and/or the STBs 118a-c. In addition, the DVR 116 and the STBs 118a-c can exchange communications (e.g., media streams of previously recorded content, messages, user input, etc.) based on their respective private IP addresses. In addition, the DVR 116 and the STB's 118a-c can send user requests for media streams to the RG 114 using the private IP addresses and the RG 114 can forward the user requests to the media content distributor 102 and/or any other suitable media content distributor using the public IP address of the of the RG 114 as a source address.

In the illustrated example of FIG. 1, the DVR 116 is capable of recording multiple media streams simultaneously. In addition, the DVR 116 is capable of playing back and delivering multiple media streams simultaneously to the STBs 118a-c. In some examples, the DVR 116 may be limited to recording and/or playing back no more than a maximum quantity of streams based on its processing capabilities (e.g., media encoding/decoding capabilities, memory access capabilities, etc.).

In the illustrated example of FIG. 1, each of the STBs 118a-c is in communication with to a respective television (not shown) for presenting media content to audience members (e.g., customers) in respective rooms (e.g., living room, bedrooms, guest room, kitchen, entertainment room, etc.) of the subscriber site 104. Also in the illustrated example, the LAN media distribution environment 112 is configured such that one or more of the STBs 118a-c can receive one or more playback media streams from the DVR 116, while others of the STBs 118a-c may simultaneously receive media streams for real-time presentation from the media content distributor 102 via the RG 114. In some examples, to enable use of pause, rewind, and fast-forward features (e.g., trick modes) in connection with real-time or substantially real-time presentations of media streams at the STBs 118a-c, all media streams are routed through the DVR 116 before distributing them to the STBs 118a-c. In this manner, the DVR 116 can implement the pause, rewind, and fast-forward features on the real-time or substantially real-time media streams by buffering or recording amounts or segments of media content while the media streams are being distributed to one or more of the STBs 118a-c in real time.

In the illustrated example of FIG. 1, bandwidth congestion may occur at any one or more of multiple points in the LAN media distribution environment 112 and/or between the subscriber site 104 and the WAN 106. For example, bandwidth congestion may occur at a WAN ingress bandwidth congestion point 122 between the RG 114 and the WAN 106 when the media streams received at the subscriber site 104 exceed a maximum downstream bandwidth of the subscriber site 104. Bandwidth congestion may occur at a DVR ingress bandwidth congestion point 124 between the DVR 116 and the RG 114 when the quantity of media streams received at the DVR 116 causes the exceeding of one or more of (a) a maximum ingress bandwidth of the DVR 116 and/or (b) a maximum processing capability (e.g., a media encoding/decoding capability, a memory access capability, etc.) of the DVR 116. Bandwidth congestion may occur at a DVR egress bandwidth congestion point 126 between the STBs 118a-c and the DVR 116 when media streams delivered by the DVR 116 causes the exceeding of one or more of (a) a maximum egress bandwidth of the DVR 116 and/or (b) a maximum processing capability (e.g., a media encoding/decoding capability, a memory access capability, etc.) of the DVR 116.

In the illustrated example of FIG. 1, bandwidth congestion at the DVR ingress bandwidth congestion point 124 may be affected by the quantity of previously recorded media being played back and delivered to one or more of the STBs 118a-c, because the same processing capability(ies) and/or resource(s) of the DVR 116 may be shared between recording (e.g., encoding) and playback (e.g., decoding) processes. Similarly, bandwidth congestion at the DVR egress bandwidth congestion point 126 may be affected by the quantity of media streams being simultaneously recorded.

In the illustrated example, the DVR 116 (or any other device in communication with the LAN media distribution environment 112) is provided with management capabilities to detect when bandwidth congestion occurs at any of the congestion points 122, 124, and 126, inform one or more users in the subscriber site 104 of the detected bandwidth congestion, and implement user-specified solutions to resolve the bandwidth congestion as described in greater detail below.

Figure 2:
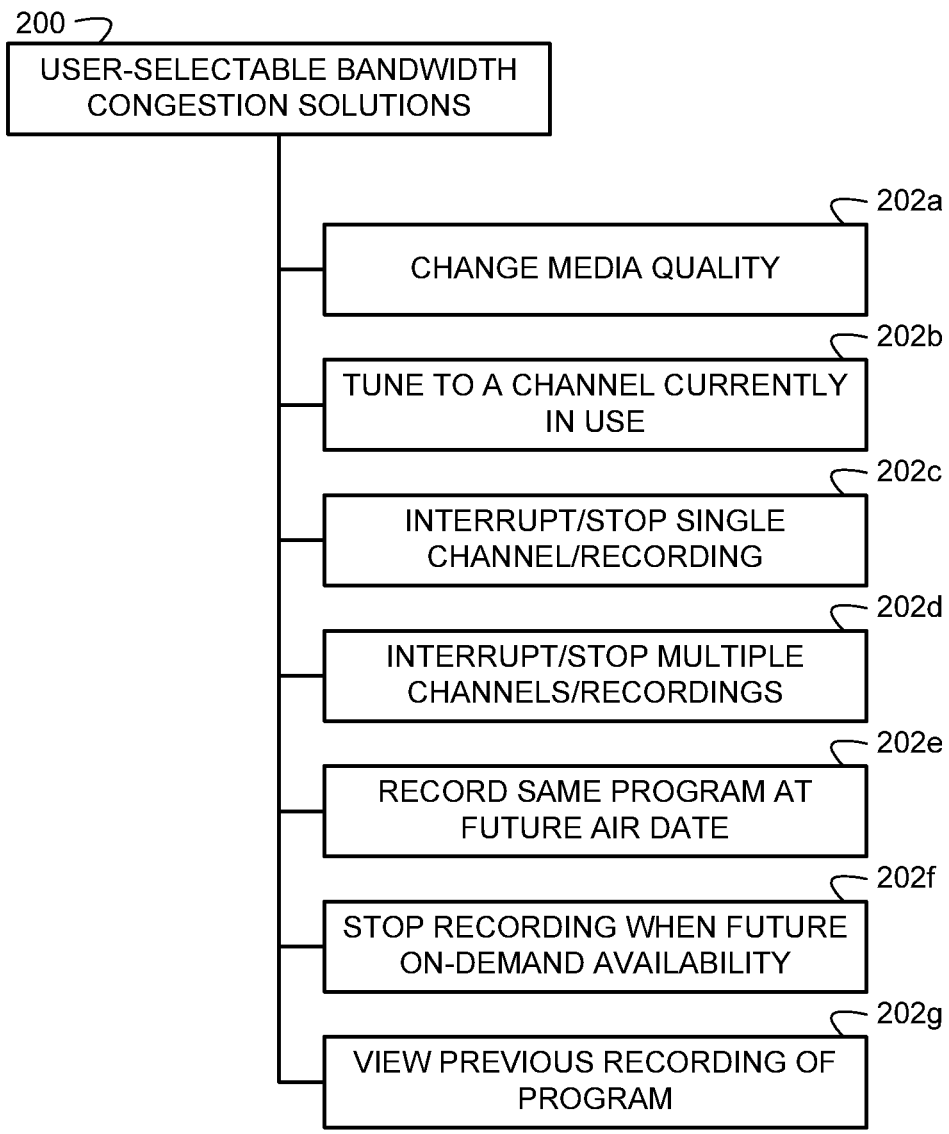
FIG. 2 depicts an example user-selectable solutions data structure including options available in the example system of FIG. 1 to allow users to select how to resolve bandwidth congestion.

Turning to FIG. 2, an example user-selectable bandwidth congestion solutions data structure 200 enables users to specify how to resolve bandwidth congestion associated with delivering media to and/or in the LAN media distribution environment 112 of FIG. 1. In the illustrated example of FIG. 2, the user-selectable bandwidth congestion solutions data structure 200 includes multiple types of user-selectable solutions enumerated 202a-g. In other example implementations, the user-selectable bandwidth congestion solutions data structure 200 may include fewer, additional, or alternative solutions.

The user-selectable bandwidth congestion solutions data structure 200 may be implemented in the DVR 116 of FIG. 1 and/or in any other device in communication with the LAN media distribution environment 112. For example, the user-selectable bandwidth congestion solutions data structure 200 and its user-selectable solutions 202a-g may be stored as data structure(s) on a machine readable medium that is accessed by a processor to implement example methods, apparatus, and systems described herein.

In the illustrated example of FIG. 2, the user-selectable bandwidth congestion solutions data structure 200 includes a 'change media quality' solution 202a, a 'tune to a channel currently in use' solution 202b, an 'interrupt/stop single channel/recording' solution 202c, an 'interrupt/stop multiple channels/recordings' solution 202d, a 'record same program at future air date' solution 202e, a 'stop recording when future on-demand availability' solution 202f, and a 'view previous recording of program' solution 202g. In the illustrated example of FIG. 2, each of the user-selectable solutions 202a-g may include messages and/or instructions displayable to users to inform users of how to implement the respective solution. Additionally or alternatively, any or all of the user-selectable solutions 202a-g may include one or more suboptions, features, and/or elements that enable users to select or specify details for implementing the solution.

In the illustrated example, the 'change media quality' solution 202a enables users to select delivery of media at lower quality. For example, users may change a media stream from an HD version to an SD version or from a 3D-TV version to an HD or SD version. Such media quality changes may be made in real time to a media stream as it is being delivered such that the delivery of the media stream will transition from a higher quality stream (e.g., an HD stream) to a lower quality stream (e.g., an SD stream). Such media quality changes may also be made to future media streams such as media streams that are scheduled for recording at some future time by the DVR 116. In some examples, changes in media quality may be made by changing a channel from an HD channel (or higher-quality channel) to a corresponding SD channel (or lower-quality channel). In some example implementations, changes to quality may be made to affect the operations of any of the STBs 118a-c or the DVR 116 even though the user-selected solution was not selected from that one of the STBs 118a-c or the DVR 116. For example, a user interacting with the STB 118a may specify that the quality of an ongoing media stream being delivered to the STB 118b or being recorded by the DVR 116 should be downgraded (e.g., from an HD version to an SD version). Such a scenario may occur when, for example, the STB 118a is located in a home theatre room in which the user would like a full HD and surround sound experience when watching a movie, while the STB 118b may be located in a child's bedroom and presenting cartoons. An example graphical user interface (GUI) that may be used to implement the 'change media quality' solution 202a is described below in connection with FIG. 4.

In some examples, the 'change media quality' solution 202a may be offered only in instances where lower quality versions of media content are available (e.g., available at the media cache 110 of the media content distributor 102). Also in some examples, even where lower quality versions of media content are available, the 'change media quality' solution 202a may be offered only when lowering the quality of a current media stream or future media stream scheduled for recording would allocate sufficient bandwidth to allow a user's current media stream selection or a user's current request to schedule a future recording.

In the illustrated example, the 'tune to a channel currently in use' solution 202b enables users to tune to a channel that is already tuned to at another location room in the same subscriber site (e.g., the subscriber site 104 of FIG. 1). For example, a user interacting with the STB 118a of FIG. 1 may initially select to watch a program at a 3D-TV quality, which requires a substantial amount of bandwidth. However, if there is insufficient bandwidth to deliver the 3D-TV quality version to the subscriber site 104, but another user in the subscriber site 104 is watching an HD quality version or an SD quality version at the STB 118c, the 'tune to a channel currently in use' solution 202b offers the user at the STB 118a the option to tune to the same channel that is tuned to at the STB 118c. In this manner, no additional bandwidth is required into the subscriber site 104. Instead, the same channel being streamed into the subscriber site 104 may be split at the RG 114 or the DVR 116 and distributed to both of the STBs 118a and 118c. An example GUI that may be used to implement the 'tune to a channel currently in use' solution 202b is described below in connection with FIG. 5.

In the illustrated example, the 'interrupt/stop single channel/recording' solution 202c enables users to interrupt a single channel being delivered for real-time viewing to a subscriber site (e.g., the subscriber site 104) and/or to stop a single recording at the subscriber site. For example, a user at the STB 118a of FIG. 1 may specify to interrupt the delivery of a media program (e.g., via a respective IPTV channel) to the STB 118b or the STB 118c. The user at the STB 118a may alternatively specify to stop recording of a media program (e.g., being delivered to the subscriber site 104 via a respective IPTV channel) at the DVR 116. In such manners, users may select any of the above-noted solutions, while specifying a specific channel and/or media program to be affected to solve bandwidth congestion.

In the illustrated example, the 'interrupt/stop multiple channels/recordings' solution 202d enables users to simultaneously interrupt one or more channels being delivered for real-time viewing to a subscriber site (e.g., the subscriber site 104) and/or simultaneously stop one or more recordings at the subscriber site. For example, a user at the STB 118a of FIG. 1 may specify interruption of the delivery of multiple media programs (e.g., via respective IPTV channels) to the STBs 118b and 118c. Additionally or alternatively, the user at the STB 118a may specify the stopping of recording of multiple media programs (e.g., being delivered to the subscriber site 104 via respective IPTV channels) at the DVR 116. Additionally or alternatively, the user at the STB 118a may specify interruption of the delivery of one or more media programs to the subscriber site 104 and simultaneously stopping of recording one or more media programs at the DVR 116. In such manners, users may select any of the above-noted solutions, while specifying specific channels and/or media programs to be affected to solve bandwidth congestion. An example GUI that may be used to implement the 'interrupt/stop multiple channels/recordings' solution 202d is described below in connection with FIG. 6.

In the illustrated example, the 'record same program at future air date' solution 202e enables users to defer recording of a media program (e.g., an episode of a television series program) from a time when a bandwidth congestion is detected or predicted, to a future time when the same media program is scheduled to be aired again. For example, data from an electronic program guide (EPG) may indicate that a particular program has one or more future air dates. Thus, users may select the 'record same program at future air date' solution 202e to re-allocate the bandwidth that would otherwise be used for the recording to instead be used for receiving other media programs at the subscriber site 104. Users may also select the 'record same program at future air date' solution 202e to re-allocate processing capabilities and/or ingress bandwidth capabilities of the DVR 116 so that the DVR 116 can instead be used to record another desired media program, while postponing the recording of an originally scheduled media program recording.

In the illustrated example, the 'stop recording when future on-demand availability' solution 202f enables users to stop recording of a media program (e.g., an episode of a television series program) at a time when bandwidth congestion is detected or predicted and when such media program is indicated as being available currently or at a future time via an on-demand service available at the subscriber site 104. For example, data from an electronic program guide (EPG) may indicate that a particular program is or will be available via the on-demand service. Thus, users may select the 'stop recording when future on-demand availability' solution 202f to re-allocate the bandwidth that would otherwise be used for the recording to instead be used for receiving other media programs at the subscriber site 104. Users may also select the 'stop recording when future on-demand availability' solution 202f to re-allocate processing capabilities and/or ingress bandwidth capabilities of the DVR 116 so that the DVR 116 can instead be used to record another desired media program.

The 'view previous recording of program' solution 202g enables users to select to view a previous recording of a media program stored in the DVR 116 (FIG. 1). For example, a user may select the 'view previous recording of program' solution 202g when the user has selected to stream the media program (e.g., via a respective IPTV channel) to the subscriber site 104 and the same media program was previously recorded by and still cached in the DVR 116. In this manner, instead of using ingress bandwidth to the subscriber site 104 to re-stream the selected media program, a user may instead elect to playback the previously recorded media program from the DVR 116.

Turning now to FIGS. 3-6, example GUI's shown therein may be displayed by any of the STBs 118a-c and/or the DVR 116 of FIG. 1 to inform users of bandwidth congestions and user-selectable solutions available to resolve such bandwidth congestions.

Figure 3:
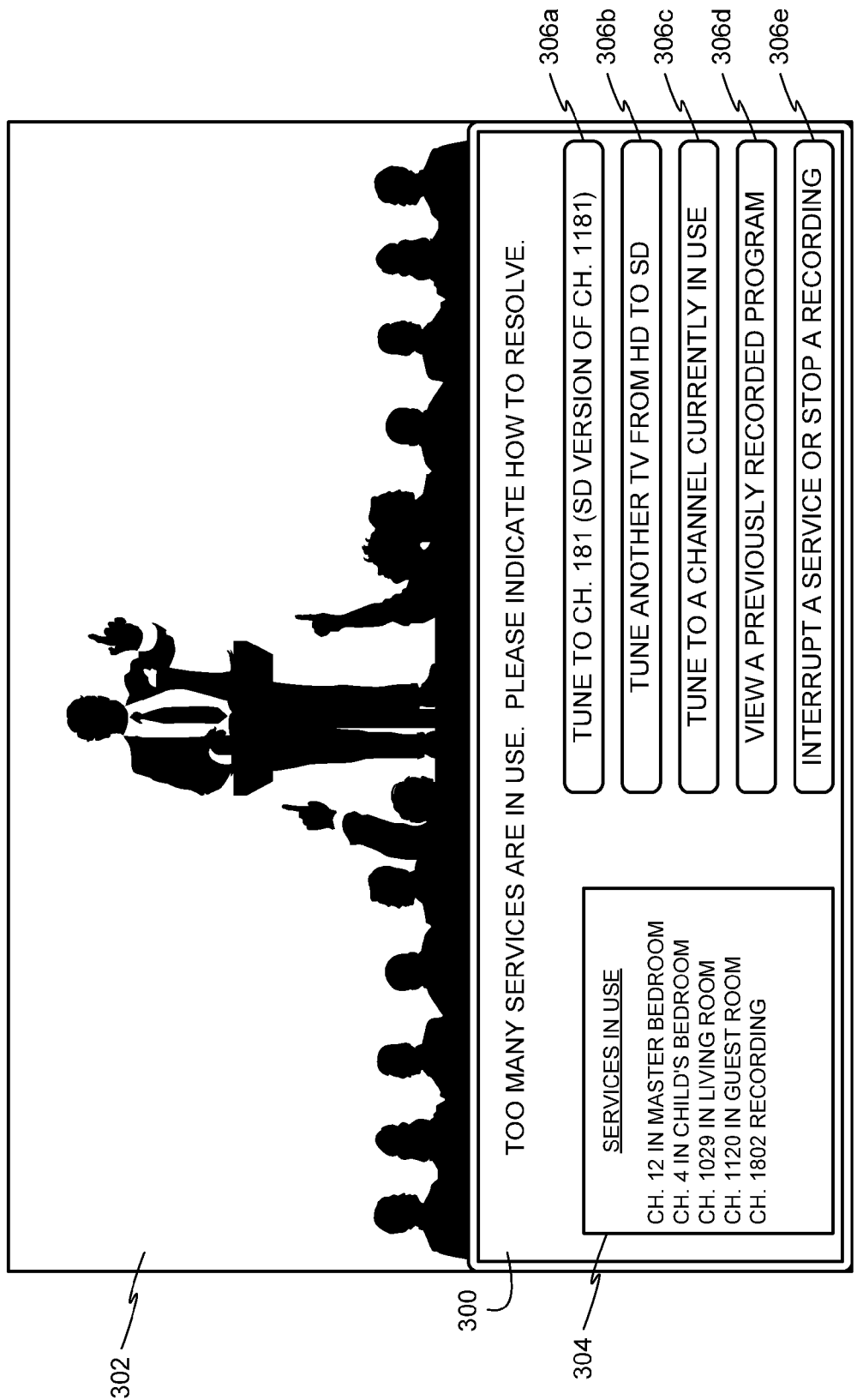
FIG. 3 depicts an example bandwidth congestion notification graphical user interface that may be used to notify users of a bandwidth congestion and receive user selections for resolving the bandwidth congestion in the example system of FIG. 1.

FIG. 3 depicts an example bandwidth congestion notification GUI 300 that may be used to notify users of a bandwidth congestion and receive user selections for resolving the bandwidth congestion in the example system 100 of FIG. 1. In the illustrated example, the bandwidth congestion notification GUI 300 may be presented on a television via any of the STBs 118a-c of FIG. 1 when a bandwidth congestion is detected or predicted. In the illustrated example of FIG. 3, the bandwidth congestion notification GUI 300 is overlaid onto a media content display area 302 being presented on a television and informs a user that too many services are in use and requests the user to specify how to resolve the bandwidth congestion.

In the illustrated example, the bandwidth congestion notification GUI 300 includes a SERVICES IN USE display area 304 and user-selectable solutions 306a-e. The SERVICES IN USE display area 304 displays channels currently tuned to in respective rooms of the subscriber site 104 of FIG. 1. In this manner, should a user elect to affect media streams being delivered to any one or more of the STBs 118a-c and/or the DVR 116, the user can refer to the SERVICES IN USE display area 304 to determine the channels tuned to at the STBs 118a-c and/or DVR 116.

In the illustrated example of FIG. 3, first and second user-selectable solutions 306a and 306c correspond to the 'change media quality' solution 202a of FIG. 2. In particular, the first user-selectable solution 306a of FIG. 3 enables a user to tune to an SD channel of a corresponding HD channel that was originally requested by the user. The second user-selectable solution 306b enables the user to tune another television (TV) (e.g. corresponding to one of the STBs 118a-c of FIG. 1) to an SD channel of a corresponding HD channel to which the other TV is currently tuned into. Selection of either solution 306a or 306b contributes to resolving a bandwidth congestion by tuning to a lower quality channel in the subscriber site 104, thereby reducing the amount of bandwidth required relative to a higher quality channel.

In the illustrated example of FIG. 3, a third user-selectable solution 306c corresponds to the 'tune to a channel currently in use' solution 202b of FIG. 2 and enables a user to tune to a same channel as is already tuned to at another STB 118a-c and/or the DVR 116 of FIG. 1 as discussed above in connection with FIG. 2. In the illustrated example, a fourth user-selectable solution 306d corresponds to the 'view previous recording of program' solution 202g of FIG. 2 and, as described above in connection with FIG. 2, enables a user to view a previous recording of the same program that the user is currently requesting to view via an IPTV channel stream. In the illustrated example, a fifth user-selectable solution 306e corresponds to one or both of the 'interrupt/stop single channel/recording' solution 202c and/or the 'interrupt/stop multiple channels/recordings' solution 202d of FIG. 2 and, as described above in connection with FIG. 2, enables a user to stop and/or interrupt one or more channels and/or recordings at any of the STBs 118a-c and/or the DVR 116.

In operation, each of the user-selectable options 306a-e, when selected, may cause an implementation of the user-specified solution or may invoke further GUIs to be displayed that enable a user to specify further parameters or features to implement a specific bandwidth congestion solution. For example, selecting the first user-selectable solution 306a of FIG. 3 causes a respective STB (e.g., the STBs 118a-c) displaying the GUI 300 to tune to the specified SD channel without requiring further user intervention. However, selection of the second user-selectable solution 306b may invoke or cause the displaying of a further GUI (e.g., an example GUI 400 of FIG. 4) so that the user can select which STB (e.g., one of the STBs 118a-c) is to be affected by a media quality downgrade.

Figure 4:
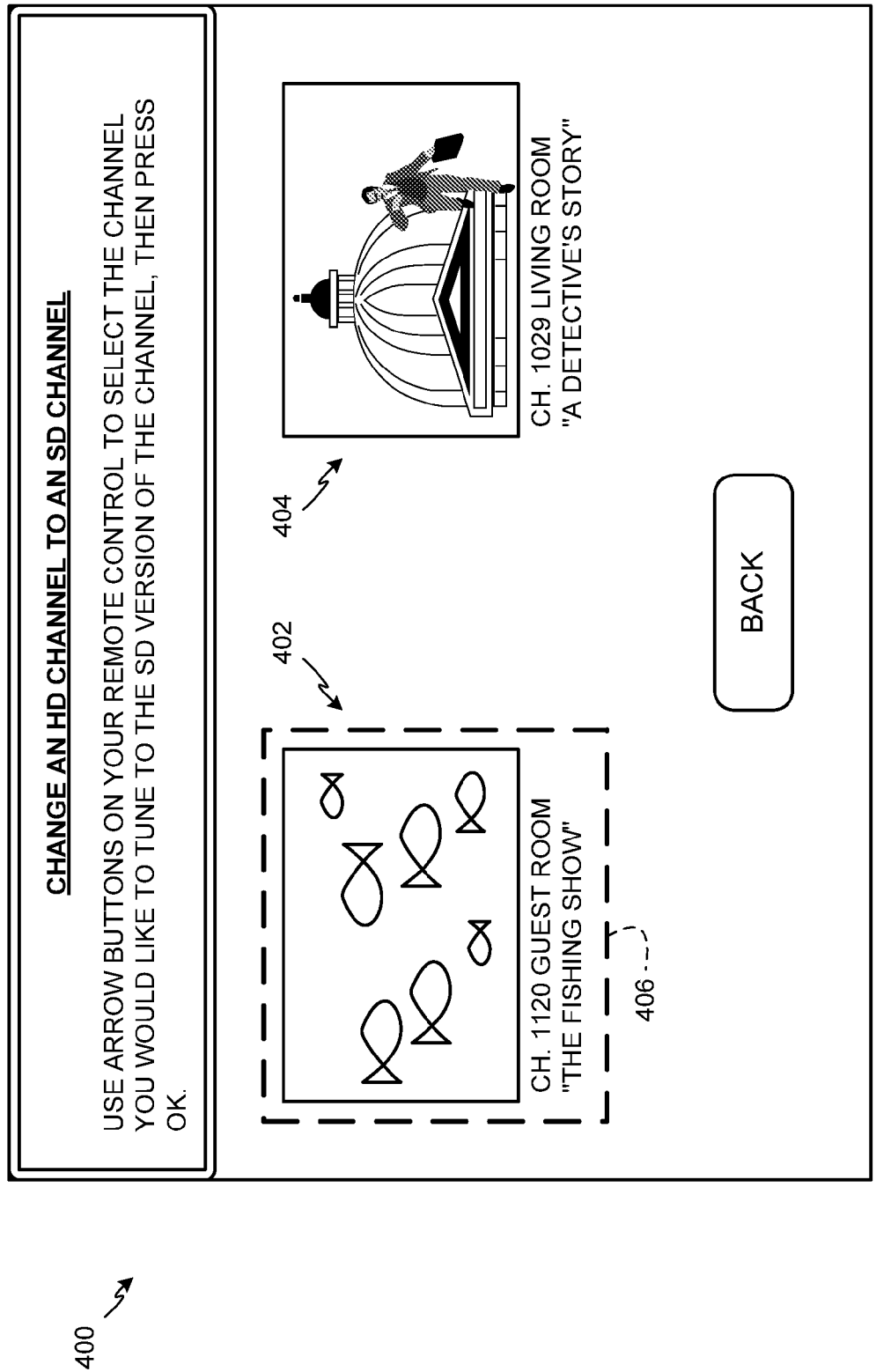
FIG. 4 depicts an example graphical user interface that may be used to change the quality of one or more media streams in a subscriber site of the example system of FIG. 1.

FIG. 4 illustrates an example media quality downgrade GUI 400 that may be displayed in response to, for example, a user selecting the second user-selectable option 306b of FIG. 3. In the illustrated example of FIG. 4, the media quality downgrade GUI 400 displays the channel tuning status of active STBs (e.g., the STBs 118a-c of FIG. 1) in the subscriber site 104 as shown by status thumbnails 402 and 404 (e.g., displayed using picture-in-picture (PIP) technology). In the illustrated example, a user controls a user interface selection tool 406 to select one of the status thumbnails 402 or 404 to specify that an STB corresponding to the selected one of the thumbnails 402 or 404 should continue to receive the same media program that it is currently receiving, but at a downgraded media quality (e.g., transition from an HD media stream (or channel) to an SD media stream (or channel)). Although the media quality downgrade GUI 400 is shown as allowing user selection of only one STB in the illustrated example, the media quality downgrade GUI 400 may alternatively be implemented to allow simultaneous user selection of two or more STBs in the subscriber site 104 to re-allocate even more bandwidth away from multiple currently active STBs.

In some examples, the media quality downgrade GUI 400 may display thumbnails (e.g., the status thumbnails 402 and 404) of only those current media streams for which lower quality versions of media content are available (e.g., available at the media cache 110 of the media content distributor 102). Also in some examples, even where lower quality versions of media content are available, the media quality downgrade GUI 400 may offer to downgrade the quality of those media streams that would result in allocating sufficient bandwidth to allow a user's current media stream selection.

Figure 5:
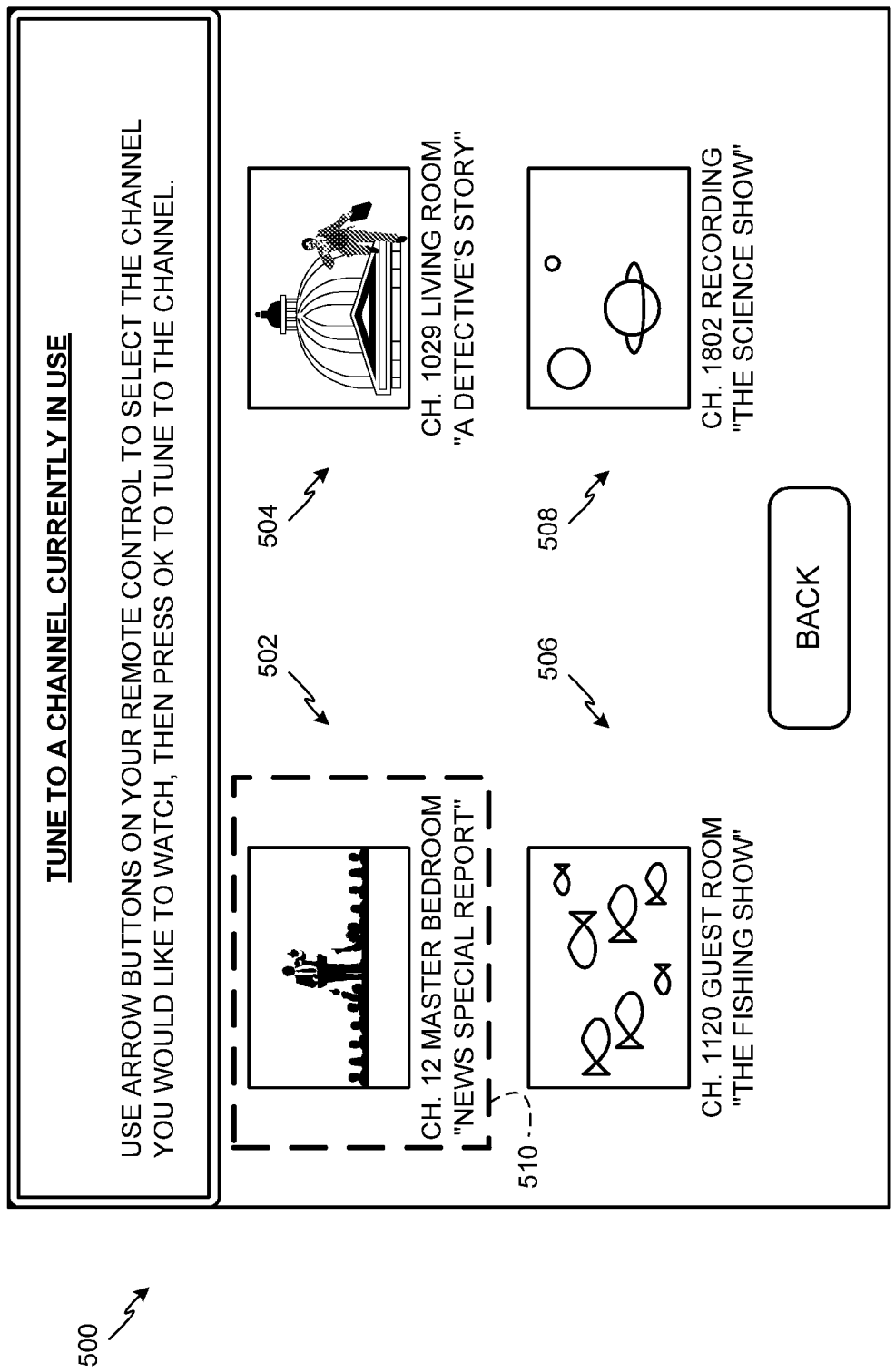
FIG. 5 depicts an example graphical user interface that may be used to tune a media client device in a subscriber site of the example system of FIG. 1 to a channel that is already currently in use at another media client device of the same subscriber site.

FIG. 5 depicts an example concurrent channel tuning GUI 500 that may be displayed in response to, for example, a user selecting the third user-selectable solution 306c of FIG. 3. In the illustrated example, the concurrent channel tuning GUI 500 displays the channel tuning status of active STBs (e.g., the STBs 118a-c of FIG. 1) in the subscriber site 104 as shown by status thumbnails 502, 504, and 506 (e.g., displayed using PIP technology). In addition, the concurrent channel tuning GUI 500 displays the channel tuning status of the DVR 116 of FIG. 1 as shown by a status thumbnail 508 (e.g., displayed using PIP technology). In the illustrated example, a user controls a user interface selection tool 510 to select one of the status thumbnails 502, 504, 506, or 508 to specify that an STB that is displaying the concurrent channel tuning GUI 500 should tune to the same channel indicated in the selected one of the status thumbnails 502, 504, 506, or 508.

Figure 6:
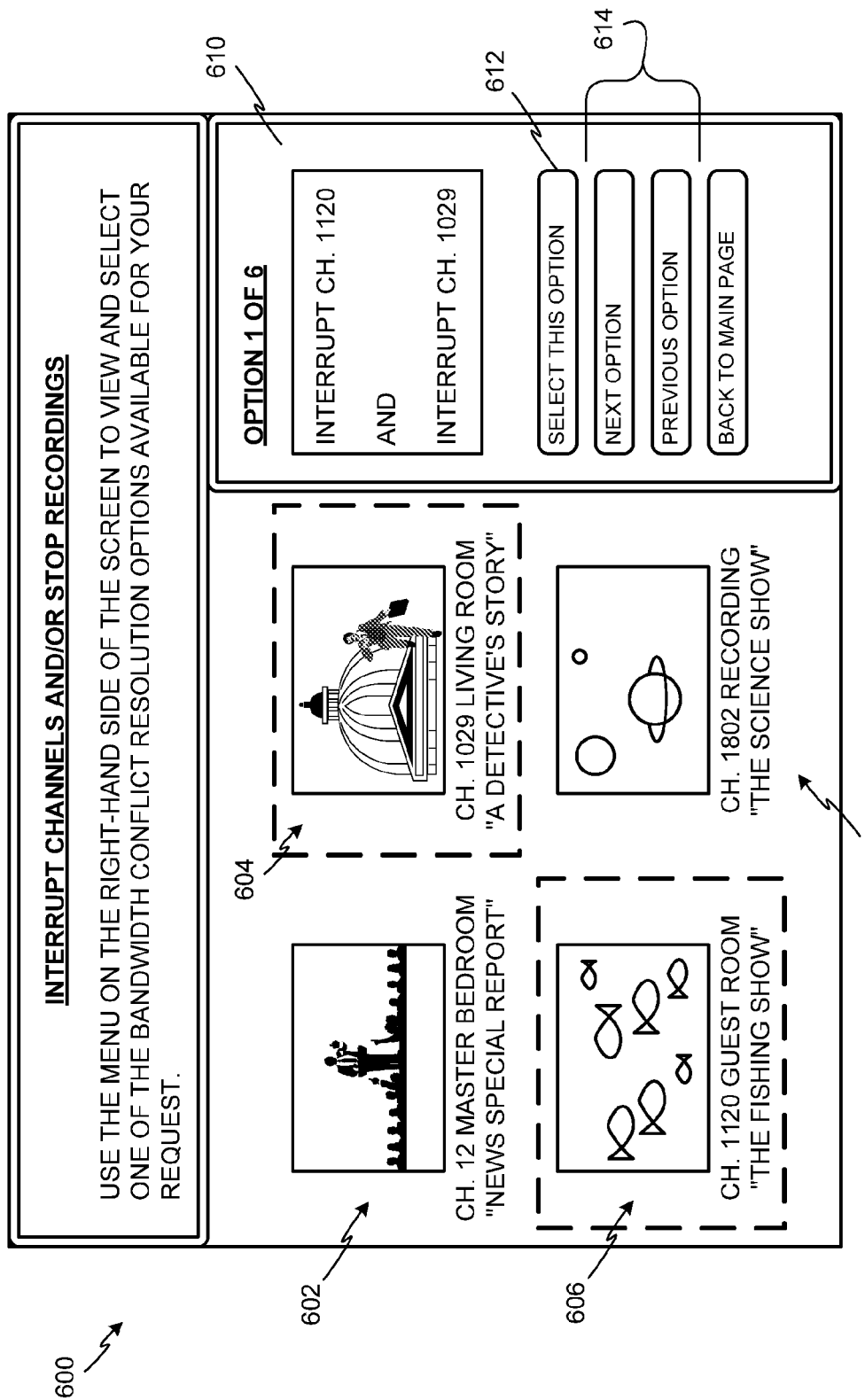
FIG. 6 depicts an example graphical user interface that may be used to interrupt and/or stop one or more channels and/or recordings in a subscriber site of the example system of FIG. 1.

FIG. 6 depicts an example interrupt/stop GUI 600 that may be displayed in response to, for example, a user selecting the fifth user-selectable solution 306e of FIG. 3. In the illustrated example, the interrupt/stop GUI 600 displays the channel tuning status of active STBs (e.g., the STBs 118a-c of FIG. 1) in the subscriber site 104 as shown by status thumbnails 602, 604, and 606 (e.g., displayed using PIP technology). In addition, the interrupt/stop GUI 600 displays the channel tuning status of the DVR 116 of FIG. 1 as shown by a status thumbnail 608 (e.g., displayed using PIP technology). In the illustrated example, the interrupt/stop GUI 600 also displays a user-selectable option display area 610 in which the interrupt/stop GUI 600 can display different options from which a user can select to implement the interrupting and/or stopping of multiple channel streams and/or recordings occurring in the subscriber site 104. For example, an example 'option 1 of 6' shown in the illustrated example of FIG. 6 indicates that a user can select to interrupt a current streaming of channels 1120 and 1029. A user can select the currently displayed option by selecting a SELECT THIS OPTION button 612 or can view other options by using navigation buttons 614 in the user-selectable option display area 610.

Figure 7:
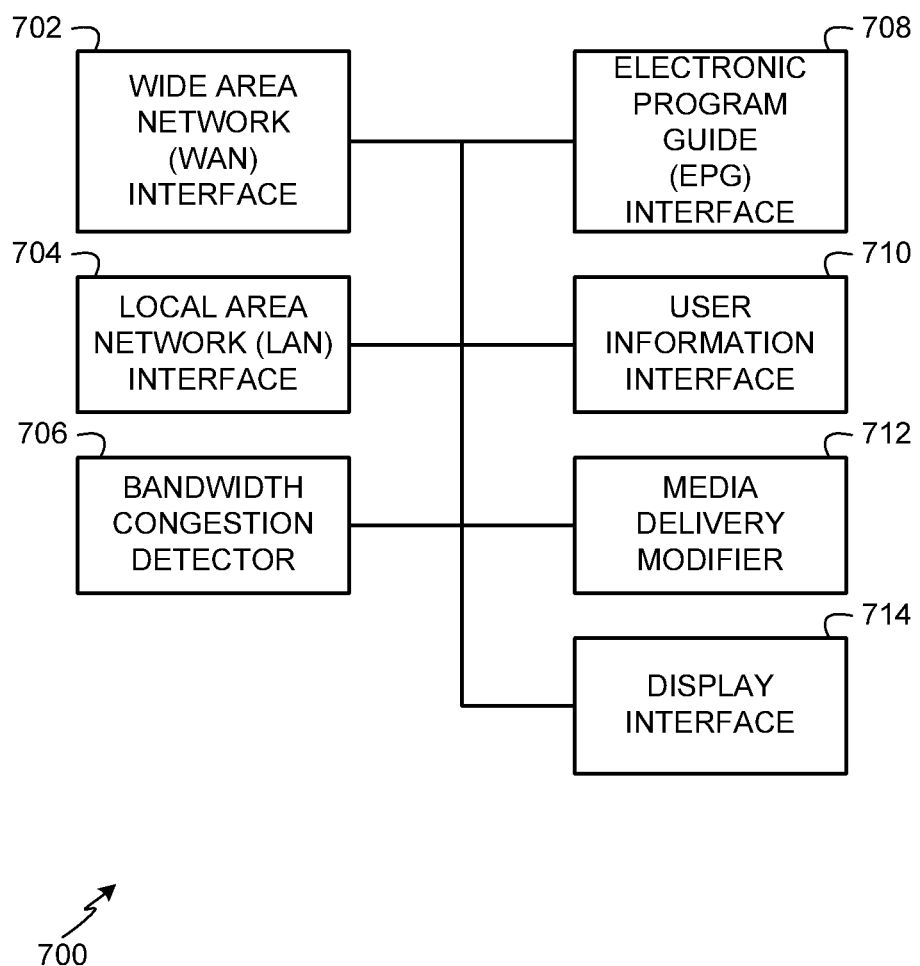
FIG. 7 is an example apparatus that may be used to manage network bandwidth allocations in the example system of FIG. 1 for delivering media as specified by users.

FIG. 7 illustrates an example apparatus 700 that may be used to solve bandwidth congestion and manage network bandwidth allocations in the example system 100 of FIG. 1 for delivering media to and/or in the subscriber site 104 of FIG. 1 as specified by users. In the illustrated example, the apparatus 700 is implemented at the DVR 116 of FIG. 1. However, the apparatus 700 may additionally or alternatively be implemented at any one or more of the RG 114, the DVR 116, the STB 118a, the STB 118b, and/or the STB 118c. In the illustrated example, the apparatus 700 is provided with an example WAN interface 702, an example LAN interface 704, an example bandwidth congestion detector 706, an example EPG interface 708, an example user information interface 710, an example media delivery modifier 712, and an example display interface 714. While an example manner of implementing the apparatus 700 has been illustrated in FIG. 7, one or more of the elements, processes and/or devices illustrated in FIG. 7 may be combined, divided, re-arranged, omitted, eliminated and/or implemented in any other way. Further, the WAN interface 702, the LAN interface 704, the bandwidth congestion detector 706, the EPG interface 708, the user information interface 710, the media delivery modifier 712, and the display interface 714 and/or, more generally, the example apparatus 700 of FIG. 7 may be implemented by hardware, software, firmware and/or any combination of hardware, software and/or firmware. Thus, for example, any of the WAN interface 702, the LAN interface 704, the bandwidth congestion detector 706, the EPG interface 708, the user information interface 710, the media delivery modifier 712, and the display interface 714 and/or, more generally, the example apparatus 700 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the WAN interface 702, the LAN interface 704, the bandwidth congestion detector 706, the EPG interface 708, the user information interface 710, the media delivery modifier 712, and/or the display interface 714 are hereby expressly defined to include a computer readable medium such as a memory, DVD, CD, etc. storing the software and/or firmware. Further still, the example apparatus 700 of FIG. 7 may include one or more elements, processes and/or devices in addition to, or instead of, those illustrated in FIG. 7, and/or may include more than one of any or all of the illustrated elements, processes and devices.

Turning in detail to FIG. 7, in the illustrated example, the apparatus 700 is provided with the WAN interface 702 to communicate with the WAN 106 of FIG. 1. For example, the apparatus 700 may send requests to receive and/or stop delivery of media content to media content providers (e.g., the media content distributor 102 of FIG. 1).

In the illustrated example, the apparatus 700 is provided with the LAN interface 704 to communicate with other devices (e.g., the RG 114, the DVR 116, and/or the STBs 118a-c of FIG. 1) in the LAN media distribution environment 112 of FIG. 1. For example, the apparatus 700 may use the LAN interface 704 to send messages, information, and/or GUIs described above in connection with FIGS. 2-6 to the DVR 116 and/or the STBs 118a-c when problematic bandwidth congestion is detected or predicted. In addition, the apparatus may use the LAN interface 704 to receive user-specified instructions on how to resolve bandwidth congestion as discussed above in connection with FIGS. 2-6.

In some examples in which the apparatus 700 is not connected directly to the WAN 106, the WAN interface 702 may be omitted and the apparatus 700 may use only the LAN interface 704 for communicating in the LAN media distribution environment 112. For example, if the apparatus 700 is implemented in the DVR 116 or one of the STBs 118a-c, the apparatus 700 may communicate to the WAN 106 via the RG 114. However, if the apparatus 700 is implemented in the RG 114, then the apparatus 700 may be provided with the WAN interface 702 to communicate via the WAN 106.

In the illustrated example, the apparatus 700 is provided with the bandwidth congestion detector 706 to detect current bandwidth congestions or predict future bandwidth congestions at any or all of the congestions points 122, 124, or 126 of FIG. 1. For example, the bandwidth congestion detector 706 may detect current bandwidth congestions when a user selects to stream a particular channel from the media content distributor 102 or playback a previously recorded program from the DVR 116, but there is insufficient bandwidth due to other currently ongoing media streams into or in the subscriber site 104. In addition, the bandwidth congestion detector 706 may predict future bandwidth congestion when a user schedules a future recording at the DVR 116 but another scheduled recording for the same time would cause for there to be insufficient bandwidth to allow the future recording that the user is attempting to schedule.

In the illustrated example, the apparatus 700 is provided with the EPG interface 708 to access and analyze one or more EPGs associated with the media subscriber services of the subscriber site 104. For example, the apparatus 700 may use the EPG interface 708 to determine future repeated air dates of media programs and/or to determine if media programs will be available in the future via on-demand media services.

In the illustrated example, the apparatus 700 is provided with the user information interface 710 to provide information for display to users related to the user-selectable bandwidth congestion solutions data structure 200 of FIG. 2 and/or any of the GUIs of FIGS. 3-6. In addition, the user information interface 710 receives user input or user selections that may be provided by users via any one or more of the DVR 116 and/or the STBs 118a-c of FIG. 1 to resolve bandwidth congestion and manage bandwidth allocation.

In the illustrated example, the apparatus 700 is provided with the media delivery modifier 712 to modify delivery of media streams to and/or in the subscriber site 104. For example, the media delivery modifier 712 may cause downgrades in one or more media qualities, may stop one or more channel streams, may interrupt one or more media recordings, may tune one or more of the STBs 118a-c and/or the DVR 114 to the same channel, etc.

In the illustrated example, the apparatus 700 is provided with the display interface 714 to display information via a television in communication with the apparatus 700. In example implementations in which the apparatus 700 is implemented in a client device (e.g., the DVR 116) that is not connected to a television, the display interface 714 may be omitted. In such examples, any information to be displayed to users is provided by the user information interface 710 and communicated via the LAN interface 704 to a client device (e.g., one of the STBs 118a-c) connected to a television for display to a user via the television.

Figure 8:
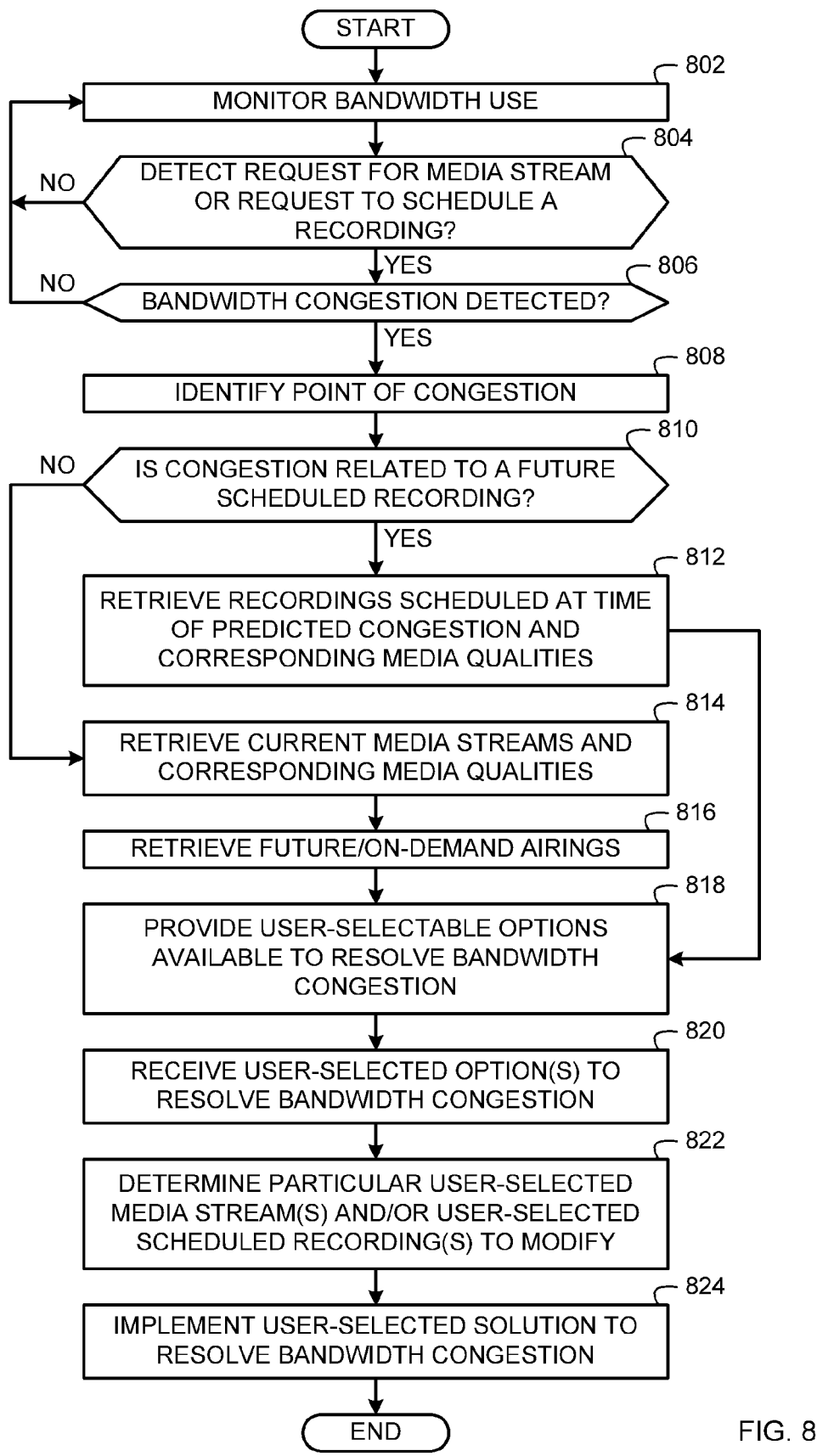
FIG. 8 is a flow diagram representative of example machine readable instructions that may be executed to manage network bandwidth allocations in the example system of FIG. 1 for delivering media as specified by users.

FIG. 8 is a flow diagram representative of machine readable instructions that can be executed to implement the apparatus of FIG. 7 to manage network bandwidth allocations in the example system 100 of FIG. 1 for delivering media as specified by users. The example process of FIG. 8 may be implemented using machine readable instructions that, when executed, cause a device (e.g., a programmable controller or other programmable machine or integrated circuit) to perform the operations shown in FIG. 8. For instance, the example process of FIG. 8 may be performed using a processor, a controller, and/or any other suitable processing device. For example, the example process of FIG. 8 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example process of FIG. 8 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example process of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example process of FIG. 8 may be implemented as any combination(s) of any of the foregoing techniques, for example, any combination of firmware, software, discrete logic and/or hardware.

Although the example process of FIG. 8 is described with reference to the flow diagram of FIG. 8, other methods of implementing the process of FIG. 8 may be employed. For example, the order of execution of the blocks may be changed, and/or some of the blocks described may be changed, eliminated, sub-divided, or combined. Additionally, one or both of the example process of FIG. 8 may be performed sequentially and/or in parallel by, for example, separate processing threads, processors, devices, discrete logic, circuits, etc.

Turning in detail to FIG. 8, initially, the bandwidth congestion detector 706 (FIG. 7) monitors bandwidth use (block 802) into and within the subscriber site 104 (FIG. 1). In the example of FIG. 8, the bandwidth congestion detector 706 determines whether a request for a media stream or a request to schedule a recording has occurred (block 804). For example, the bandwidth congestion detector 706 can monitor messages to the RG 114 requesting media from the media content distributor 102 of FIG. 1 or any other media content provider. Additionally, the bandwidth congestion detector 706 can monitor requests for playing back previously recorded media from the DVR 116 of FIG. 1 and/or for scheduling recordings at the DVR 116. If no request is detected at block 804, control returns to block 802 to continue monitoring. If a request is detected (block 804), control advances to block 806.

At block 806, the bandwidth congestion detector 706 attempts to detect or predict congestion. If the bandwidth congestion detector 706 does not detect or predict bandwidth congestion based on the request(s) detected at block 804 (block 806), control returns to block 802. If the bandwidth congestion detector 706 does detect or predict bandwidth congestion (block 806), control advances to block 808, at which the bandwidth congestion detector 706 identifies a point of congestion (block 808). For example, the bandwidth congestion detector 706 can determine whether congestion occurred (or will occur) at the WAN ingress bandwidth congestion point 122, the DVR ingress bandwidth congestion point 124, and/or the DVR egress bandwidth congestion point 126.

If the bandwidth congestion detector 706 determines that the bandwidth congestion is related to a future scheduled recording (block 810) at, for example, the DVR 116, the user information interface 710 (FIG. 7) retrieves recordings scheduled at the time of the predicted bandwidth congestion and corresponding media qualities (e.g., 3D-TV quality, HD quality, SD quality, etc.) (block 812). In the illustrated example, the user information interface 710 retrieves such information to inform a user of the previously scheduled recordings that are causing the bandwidth congestion detected in response to the most recent recording scheduling request of block 804.

If the bandwidth congestion detector 706 determines that the bandwidth congestion is not related to a future scheduled recording (block 810), the user information interface 710 retrieves current media streams and corresponding media qualities (e.g., 3D-TV quality, HD quality, SD quality, etc.) (block 814), including any current media streams that are currently being recorded at the DVR 116. In the illustrated example, the user information interface 710 retrieves such information to inform a user of current media streams that are causing the bandwidth congestion detected in response to the most recent media stream request of block 804.

After retrieving information at block 812 or at block 814, the EPG interface 708 (FIG. 7) retrieves any future airing dates/times and/or on-demand availability of one or more of the scheduled recordings retrieved at block 812 and the media program requested for recording at block 804. Alternatively, the EPG interface 708 retrieves any future airing dates/times and/or on-demand availability of one or more of the current media streams retrieved at block 814 and/or requested for viewing at block 804. In the illustrated example, the EPG interface 708 retrieves such information to inform the user of which media programs can be viewed and/or recorded at another time based either on a future scheduled airing or on availability via an on-demand service.

The user information interface 710 provides user-selectable options available to resolve bandwidth congestion (block 818). For example, the user information interface 710 may provide a message to one of the STBs 118a-c from which the user made the request detected at block 804. In the illustrated example, the message causes the one of the STBs 118a-c to display the bandwidth congestion notification GUI 300 of FIG. 3. In addition, as the user interacts with the bandwidth congestion notification GUI 300, the user information interface 710 provides further messages to cause the one of the STBs 118*a*-*c* to display one or more of the GUI's 400, 500, and/or 600 or any other suitable GUI to interact with the user based on any of the user-selectable bandwidth congestion solutions 202*a*-*g* of FIG. 2 specified by the user as a solution.

The user information interface 710 receives one or more user-selected option(s) to resolve the bandwidth congestion (block 820). For example, the user-selected options may be specified by a user as any one or more of the solutions described above in connection with FIGS. 2-6. The media delivery modifier 712 (FIG. 7) analyzes the user-selected option(s) to determine particular user-selected media stream(s) and/or user-selected recording(s) to modify (block 822). In the illustrated example, modifications may involve changing a media quality of a current media stream or a media stream scheduled for recording, interrupting a current media stream, stopping an ongoing recording or future scheduled recording, re-scheduling an ongoing recording or future scheduled recording, and/or any other user-specified solution(s) described above.

The media delivery modifier 712 implements the user-selected solution to resolve the bandwidth congestion (block 824). For example, the media delivery modifier 712 may communicate with any one or more of the STBs 118*a*-*c* (FIG. 1) to interrupt a current media stream or downgrade the quality of a current media stream. Alternatively or additionally, the media delivery modifier 712 may communicate directly with the media content distributor 102 via the RG 114 (FIG. 1) to interrupt a current media stream or downgrade the quality of a current media stream. Alternatively or additionally, the media delivery modifier 712 may communicate with the DVR 116 to stop and/or reschedule a recording. The example process of FIG. 8 then ends.

Figure 9:
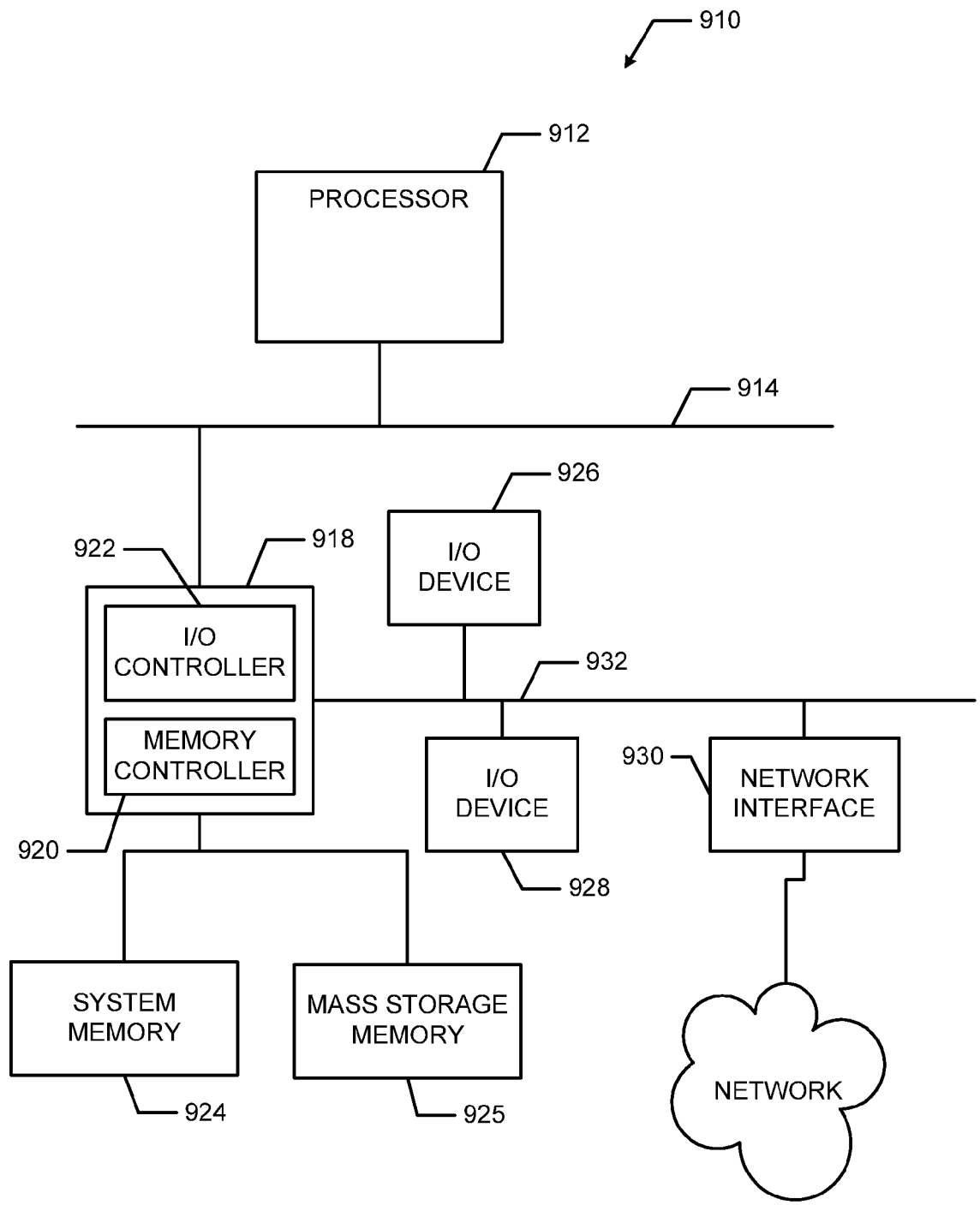
FIG. 9 is an example processor system that can be used to execute the example instructions of FIG. 8 to implement example systems and apparatus of FIGS. 1 and 7 described herein.

FIG. 9 is a block diagram of an example processor system 910 that may be used to implement the example apparatus, methods, and systems described herein. As shown in FIG. 9, the processor system 910 includes a processor 912 that is coupled to an interconnection bus 914. The processor 912 may be any suitable processor, processing unit, or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. A chipset provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

In general, the system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a digital subscriber line (DSL) modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. Accordingly, while the above describes example methods, apparatus, systems, and articles of manufacture, the examples provided are not the only ways to implement such methods, apparatus, systems, and articles of manufacture.

Although certain example methods, apparatus, systems, and articles of manufacture have been described herein, the scope of coverage of this patent is not limited thereto. On the contrary, this patent covers all methods, apparatus, systems, and articles of manufacture fairly falling within the scope of the claims of this patent.

What is claimed is:

1. A method to manage network bandwidth allocation in a media delivery environment, the method comprising:
   monitoring bandwidth usage for a subscriber site;
   based on the monitored bandwidth usage, detecting insufficient bandwidth available to deliver requested media to a first media receiver at the subscriber site;
   determining whether the insufficient bandwidth occurrence is to occur at least at one of (1) a subscriber site interface to a wide area network, and (2) at a network interface within the subscriber site between the first media receiver and a digital video recorder;
   based on determining where the insufficient bandwidth is to occur, presenting a first user-selectable option via the first media receiver to allocate bandwidth from delivery of second media to the subscriber site to delivery of the requested media to the first media receiver;
   receiving a first user selection of the first user-selectable option; and
   implementing the selected first user-selectable option by changing the second media to a media quality that is lower than a higher media quality previously selected for the second media and allocating a portion of the bandwidth previously used for delivery of the second media to delivery of the requested media.

2. A method as defined in claim 1, wherein the second media is the media requested for delivery to the first media receiver.

3. A method as defined in claim 1, wherein the second media is delivered to a second media receiver in the subscriber site at the higher media quality prior to the implementing of the selected first user-selectable option, and wherein the implementing of the selected first user-selectable option causes the second media to continue to be delivered to the second media receiver, but at the lower media quality.

4. A method as defined in claim 1, wherein the first user-selectable option specifies downgrading a quality of the second media, and a second user-selectable option specifies stopping a digital video recorder from performing a scheduled recording.

5. A method as defined in claim 4, wherein a third user-selectable option specifies tuning the first media receiver to a same channel already tuned to by a second media receiver in the subscriber site.

6. A method as defined in claim 4, wherein the second user-selectable option further specifies recording a media program corresponding to the scheduled recording at a future air date of the same media program.

7. A method as defined in claim 6, wherein the media program is an episode of a television program series.

8. A method as defined in claim 4, wherein the second user-selectable option indicates that a media program corresponding to the scheduled recording is at least one of (1) currently available via an on-demand media delivery service, and (2) will be available in the future via the on-demand media delivery service.

9. A tangible computer readable medium comprising machine readable instructions that, when executed, cause a machine to perform operations comprising:
monitoring bandwidth usage for a subscriber site;
based on the monitored bandwidth usage, detecting insufficient bandwidth available to deliver requested media to a first media receiver at a subscriber site;
determining whether the insufficient bandwidth occurrence is to occur at least at one of (1) a subscriber site interface to a wide area network, and (2) a network interface within the subscriber site between the first media receiver and a digital video recorder;
based on determining where the insufficient bandwidth is to occur, presenting user-selectable options via the first media receiver to re-allocate bandwidth for the subscriber site to enable delivery of the requested media to the first media receiver; and
implementing a first one of the user-selectable options in response to a selection by adjusting second media to a media quality that is lower than a higher media quality previously selected for the second media.

10. A tangible computer readable medium as defined in claim 9, wherein the second media is delivered to a second media receiver in the subscriber site at the higher media quality prior to the implementing of the selected first user-selectable option, and the implementing of the selected first user-selectable option to cause the second media to continue to be delivered to the second media receiver, but at the lower media quality.

11. An apparatus to manage network bandwidth allocation in a media delivery environment, the apparatus comprising:
a processor; and
a memory comprising instructions that, when executed by the processor, cause the processor to perform operations comprising:
monitoring bandwidth usage for a subscriber site;
determining whether an occurrence of insufficient bandwidth is to occur at least at one of (1) a subscriber site interface to a wide area network, and (2) a network interface within the subscriber site between the media receiver and a site media server;
based on the monitored bandwidth usage and based on determining where the insufficient bandwidth is to occur, providing a first user-selectable option via a first media receiver at the subscriber site to allocate bandwidth from delivery of second media to the subscriber site to delivery of requested media to the first media receiver in response to detecting the occurrence of the insufficient bandwidth available to deliver the requested media to the first media receiver;
receiving a first user selection of the first user-selectable option;
implementing the selected first user-selectable option to decrease a media quality of the second media; and
allocating, to delivery of the requested media, a portion of the bandwidth previously used for delivery of the second media.

12. An apparatus as defined in claim 11, wherein the second media is the media requested for delivery to the first media receiver.

13. An apparatus as defined in claim 11, wherein the operations further comprise providing a second user-selectable option associated with stopping a digital video recorder from performing a scheduled recording.

14. An apparatus as defined in claim 13, wherein the operations further comprise providing a third user-selectable option associated with tuning the first media receiver to a same channel already tuned to by a second media receiver in the subscriber site.

15. An apparatus as defined in claim 13, wherein the second user-selectable option further specifies recording a media program corresponding to the scheduled recording at a future presentation date of the same media program.

16. An apparatus as defined in claim 15, wherein the media program is an episode of a television program series.

17. An apparatus as defined in claim 13, wherein the operations further comprise indicating that a media program corresponding to the scheduled recording is at least one of (1) currently available via an on-demand media delivery service, or (2) will be available in the future via the on-demand media delivery service.

18. An apparatus as defined in claim 11, wherein the site media server is a digital video recorder.

19. An apparatus to manage network bandwidth allocation in a media delivery environment, the apparatus comprising:
a processor; and
a memory comprising instructions that, when executed by the processor, cause the processor to perform operations comprising:
monitoring bandwidth usage for a subscriber site;
based on the monitored bandwidth usage, providing a first user-selectable option via a first media receiver at the subscriber site to allocate bandwidth from delivery of second media to the subscriber site to delivery of requested media to the first media receiver in response to detecting an occurrence of insufficient bandwidth available to deliver the requested media to the first media receiver;
receiving a first user selection of the first user-selectable option;
implementing the selected first user-selectable option to decrease a media quality of the second media, wherein the second media is to be delivered to a second media receiver in the subscriber site at a high definition media quality prior to the implementing of the selected first user-selectable option, and the instructions are to further cause the processor to implement the selected first user-selectable option by replacing the second media at the high definition media quality with delivery of both of the first and second media at a standard definition media quality based on an availability of bandwidth detected by the monitoring of the bandwidth usage; and allocating, to delivery of the requested media, a portion of the bandwidth previously used for delivery of the second media.

20. An apparatus as defined in claim 19, wherein monitoring the bandwidth usage for the subscriber site comprises determining whether the insufficient bandwidth occurrence is at least at one of (1) a subscriber site interface to a wide area network, or (2) a network connection in the subscriber site between the media receiver and a site media server.

* * * * *